Sept. 16, 1930.   C. N. REMFRY   1,775,696
WARNING VALVE DEVICE

Filed Oct. 23, 1929

Inventor:
Charles N. Remfry,
By Usins + Kauber
attys.

Patented Sept. 16, 1930

1,775,696

UNITED STATES PATENT OFFICE

CHARLES N. REMFRY, OF PROCTOR, MINNESOTA

WARNING-VALVE DEVICE

Application filed October 23, 1929. Serial No. 401,753.

My invention relates to warning valves and more especially to warning valves for use in connection with railway air brake systems.

The particular use to which my present invention is adapted is in connection with warning signals for the indication of pressure in locomotive brake cylinders wherein the pressure is less than is registered on the air brake gauges. A locomotive brake cylinder pressure of less than five pounds per square inch will not cause any indication on the brake cylinder gauge and this may occur from several causes. Some of these causes are incomplete release of pressure in air brake cylinders by the engineer after application, leaving the brakes slightly set, slight building up of pressure in the brake cylinders caused by train line leakage greater than can be maintained by the air pumps at the feed valve setting, overcharge of train line above normal train line pressure or by incorrect setting of brake valves.

These conditions may cause excessive wear of brake shoes, tire and wheel treads, excessive train stalls, excessive use of fuel, delay in train handling and overheating of tires, loosening of tires, and consequent damage due to derailment. These low pressures are unknown to the engineer since they will not register on the brake cylinder gauge, and the purpose of my present invention is to provide for the detection and indication of the same.

It is an object of my invention to provide a warning valve for indicating a less than normal pressure.

Another object of my invention is to provide a warning valve signal which is operable directly by the brake cylinder pressure.

Another object is to provide a warning valve signal which will give warning only while the low pressure condition exists.

Figure 1:
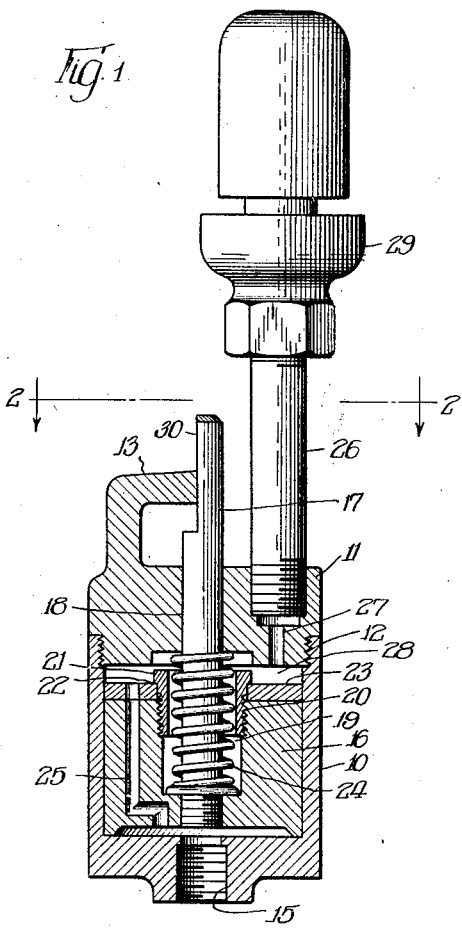
Figure 2:
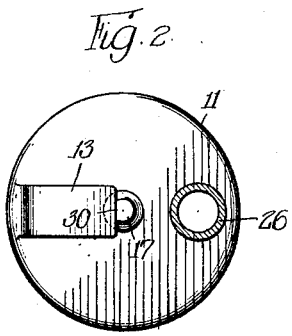

Other objects and advantages will appear and be brought out more fully in the following specification, in which reference is had to the accompanying drawing—wherein Figure 1 is a sectional view of a valve embodying my invention;

Figure 2 is a sectional view taken along the line 2—2 of Figure 1.

Referring more particularly to the drawing, I show a valve having a cylinder 10, a cylinder head 11 secured thereto as by threads 12 or by any other suitable means. The cylinder head 11 is provided with an upstanding lug 13 having a facing portion 14 and cylinder 10 is provided with an inlet opening 15 which is screw threaded for pipe connection with the brake cylinder of a car or locomotive. Within the cylinder 10 is a piston 16 to which is suitably secured a piston rod 17 and rod 17 passes through an aperture 18 in cylinder head 11. Piston 16 has a central recess 19, the top of which is threaded at 20 to provide for screw connection with a rod retainer 21, which has a shoulder 22 adapted to hold in place on piston 16 a suitable packing ring 23. A spring 24 is disposed about piston rod 17 and between cylinder head 11 and piston 16. A passageway 25 is provided through piston 16 from top to bottom and this passage is continued through packing ring 23. A pipe 26 is suitably secured in cylinder head 11 and a passage 27 is provided in cylinder head 11 to communicate with the space 28 in the cylinder and the interior of pipe 26. A whistle 29 is located on the end of pipe 26 and adapted to operate to give a signal by air pressure from space 28. Piston rod 17 has a faced portion 30 adapted to slide along facing portion 14 of lug 13 and prevents the piston rod 17 and piston 16 from rotation.

This arrangement is such that the upper opening in passageway 25 can not come opposite passage 27, which if it occurred would prevent the valve action of the device. Passageway 25 is of small cross section in comparison with the area of piston 16, the effect of which relation is that a pressure of five pounds or more applied to the lower side of piston 16 through opening 15 will lift piston 16 and fill space 28 since any air pressure developed in space 28 will be dissipated through whistle 29 and passageway 25 is not large enough to admit enough air to space 28 to create an effective back pressure on piston 16. When, now, the pressure of the locomotive brake cylinder which is effective through opening 15 is reduced for any reason, such as hereinbefore mentioned, to a value less than five pounds or other figure determined mainly by the spring tension, piston 16 will fall and pressure communication will be opened through passageway 25 and space 28 to the whistle 29 giving a signal. The engineer on hearing the signal will correct the condition by giving a slight release to all brake cylinders, and the whistle stops blowing.

It is of course understood that the valve action hereindescribed is adapted to operate electrical contacts or actuate any suitable type of audible or visible signal and my invention is not deemed to be limited to the precise form shown which is illustrative only.

Having thus described my invention, what I claim as new and desire to secure by United States Patent, is:

1. A warning valve device comprising, in combination, a casing having inlet and outlet openings, a valve adapted to operate in said casing and control said outlet opening, a passageway in said valve adapted to be closed by said valve in one of its positions, said passageway adapted to be in communication with said outlet when the valve is in the other said position, and an indicator connected to said outlet.

2. A warning valve device comprising, in combination, a casing having an inlet opening and an outlet opening, a piston valve in said casing, means tending to bias said valve in said casing in a direction away from said outlet, an opening through said piston, an indicator connected with said outlet and adapted to be actuated by fluid pressure, said valve being adapted to close said outlet in one position thereof.

3. A warning valve comprising, in combination, a casing having an inlet and an outlet opening, a valve in said casing adapted upon actuation to close said outlet opening, an aperture in said valve adapted to provide a passageway between said openings, a guide rod for said valve, an opening in said casing for said guide rod and means adapted to bias said valve in said casing in a direction to maintain said outlet open.

4. A warning valve device comprising, in combination, a cylinder having an inlet opening and an outlet opening, a piston in said cylinder having an aperture therein, a packing ring on said piston, a guide rod for said piston, and a pressure actuated signal connected to said outlet opening, said cylinder having means adapted to limit the rotation of said piston.

5. A warning valve device comprising, in combination, a cylinder having an inlet port and an outlet port, a valve in said cylinder adapted to control said outlet port by variation of pressure from said inlet port, means engaging said piston and said cylinder adapted to bias said valve to keep the outlet port open, means adapted to limit the rotation of said piston, a passageway through said piston whereby to transmit the pressure from said inlet port to said outlet port when said valve is in the open position, and a fluid pressure signal connected to said outlet port.

Signed at Proctor, Minnesota, this 17th day of October, 1929.

CHARLES N. REMFRY.